United States Patent
Lu et al.

(10) Patent No.: US 12,482,340 B2
(45) Date of Patent: Nov. 25, 2025

(54) LARGE SHIP SECURITY MANAGEMENT SYSTEM

(71) Applicant: CCCC NATIONAL ENGINEERING RESEARCH CENTER OF DREDGING TECHNOLOGY AND EQUIPMENT CO., LTD., Shanghai (CN)

(72) Inventors: Jiajun Lu, Shanghai (CN); Wenbo Dai, Shanghai (CN); Liuyan Wang, Shanghai (CN); Ting Xu, Shanghai (CN); Ming Ji, Shanghai (CN); Shu Xu, Shanghai (CN); Yanchao Shen, Shanghai (CN); Wei Wang, Shanghai (CN); Youcheng Xu, Shanghai (CN); Yiming Du, Shanghai (CN)

(73) Assignee: CCCC NATIONAL ENGINEERING RESEARCH CENTER OF DREDGING TECHNOLOGY AND EQUIPMENT CO., LTD., Shanghai (CN)

(*) Notice: Subject to any disclaimer, the term of this patent is extended or adjusted under 35 U.S.C. 154(b) by 0 days.

(21) Appl. No.: 18/835,582

(22) PCT Filed: Nov. 17, 2023

(86) PCT No.: PCT/CN2023/132323
§ 371 (c)(1),
(2) Date: Feb. 28, 2025

(87) PCT Pub. No.: WO2024/104461
PCT Pub. Date: May 23, 2024

(65) Prior Publication Data
US 2025/0201098 A1 Jun. 19, 2025

(51) Int. Cl.
*G08B 21/04* (2006.01)
*G06N 3/043* (2023.01)
(Continued)

(52) U.S. Cl.
CPC ......... *G08B 21/0453* (2013.01); *G06N 3/043* (2023.01); *G06V 20/53* (2022.01); *G06V 40/161* (2022.01); *G08B 21/0423* (2013.01)

(58) Field of Classification Search
CPC ............ G08B 21/0453; G08B 21/0423; G06N 3/043; G06V 20/53; G06V 40/161
See application file for complete search history.

(56) References Cited

U.S. PATENT DOCUMENTS 10,492,981 B1 * 12/2019 Kumar ................... A61H 19/44
11,961,319 B2 * 4/2024 Mullins .................. G06V 20/53
(Continued)

FOREIGN PATENT DOCUMENTS

CN 112255946 A 1/2021
CN 113408941 A 9/2021
(Continued)

*Primary Examiner* — Mohamed Barakat
(74) *Attorney, Agent, or Firm* — Hawaii Patent Services; Nathaniel K. Fedde; Kenton N. Fedde

(57) ABSTRACT

A large ship safety supervision system, configured to realize shipmen monitoring and ship safety supervision, wherein shipmen monitoring comprising monitoring of real time positions of shipmen in cabins and shipmen health data, and ship safety supervision comprises oceanic condition warning, on board devices running condition monitoring, ship navigation/construction monitoring and ship remote guidance. Data transmission in between ships and shores is realized by the hybrid self-adaptive compression technology based on model classification and the data transmission link intelligent selection technology based on fuzzy neural network creatively, in the meanwhile, real time safety manage- (Continued)

ment and supervision and ship remote work analysis and guidance can be realized.

2 Claims, 6 Drawing Sheets

(51) Int. Cl.
*G06V 20/52* (2022.01)
*G06V 40/16* (2022.01)

(56) References Cited

U.S. PATENT DOCUMENTS

| 2008/0147257 | A1* | 6/2008 | Kuhlgatz | B63B 49/00 |
| | | | | 705/1.1 |
| 2020/0050202 | A1* | 2/2020 | Suresh | G06V 20/00 |
| 2021/0174952 | A1* | 6/2021 | Leong | H04L 67/12 |
| 2021/0264764 | A1* | 8/2021 | Glynn | G08B 25/016 |
| 2022/0036302 | A1* | 2/2022 | Cella | G06N 20/00 |
| 2024/0220610 | A1* | 7/2024 | Song | G06N 3/0895 |
| 2024/0395076 | A1* | 11/2024 | Alfaro Suzan | G06N 3/08 |

FOREIGN PATENT DOCUMENTS

| KR | 20210138985 A | 11/2021 |
| KR | 20230040019 A | 3/2023 |
| KR | 102524953 B1 | 4/2023 |

* cited by examiner

| RSS | Bandwidth | Load | Latency | Signal-noise ratio | Communication expense | Candidate link grade |
|---|---|---|---|---|---|---|
| High | High | Low | Medium | Medium | Medium | Excellent |
| High | High | Medium | Medium | Medium | Medium | Better |
| High | High | High | Medium | Medium | Medium | Bad |
| High | Medium | Low | Medium | Medium | Medium | Better |
| High | Medium | Medium | Medium | Medium | Medium | Good |
| High | Medium | High | Medium | Medium | Medium | Poor |
| High | Low | Low | Medium | Medium | Medium | Bad |
| High | Low | Medium | Medium | Medium | Medium | Poor |
| High | Low | High | Medium | Medium | Medium | Extremely poor |
| Medium | High | Low | Medium | Medium | Medium | Better |
| Medium | High | Medium | Medium | Medium | Medium | Good |
| Medium | High | High | Medium | Medium | Medium | Poor |
| Medium | Medium | Low | Medium | Medium | Medium | Good |
| Medium | Medium | Medium | Medium | Medium | Medium | Poor |
| Medium | Medium | High | Medium | Medium | Medium | Poor |
| Medium | Low | Low | Medium | Medium | Medium | Poor |
| Medium | Low | Medium | Medium | Medium | Medium | Poor |
| Medium | Low | High | Medium | Medium | Medium | Extremely poor |
| Low | High | Low | Medium | Medium | Medium | Bad |
| Low | High | Medium | Medium | Medium | Medium | Poor |
| Low | High | High | Medium | Medium | Medium | Extremely poor |
| Low | Medium | Low | Medium | Medium | Medium | Poor |
| Low | Medium | Medium | Medium | Medium | Medium | Poor |
| Low | Medium | High | Medium | Medium | Medium | Extremely poor |
| Low | Low | Low | Medium | Medium | Medium | Poor |
| Low | Low | Medium | Medium | Medium | Medium | Extremely poor |
| Low | Low | High | Medium | Medium | Medium | Extremely poor |

Figure 4

LARGE SHIP SECURITY MANAGEMENT SYSTEM

TECHNICAL FIELD

The present invention relates to the technical field of ship safety supervision, specifically a large ship safety supervision system.

BACKGROUND TECHNOLOGY

Geological, hydrological and meteorological environments at large engineering ship construction sites are complex, the safety risks are outstanding due to influences of dynamic changes of a plurality of marine natural environmental factors such as wind and wave currents, it is difficult to promise real-time, stability and reliability of the conventional ship safety supervision techniques and methods, and bottlenecks exist in safety supervision of large ships. Structures of large ships are usually steel structures, the ship bodies are hard, space in the ships is closed and narrow, and with the conventional positioning system real time positions of persons in the multi-compartment ships cannot be tracked efficiently. During construction, the shipmen suffer from unsmooth communication, lack of accurate and real time in-cabin positioning, one-key electronic warning, safety electronic rails and alert for erroneously entering dangerous areas. The shipmen live in a long term in bad environments of "four high two lacks and one over" (high temperature, high humidity, high salinity, high irradiation, lack of earth, lack of water and over sudden storm), the job is difficult, the environment is boring, health conditions of the shipmen will inevitably be affected to some degrees, a variety of health problems such as blood pressure rise, sleeping disorders, unstable body temperature and arrhythmia may occur. The environments in the ships are complicated, general on-land health monitoring system cannot serve efficiently in large construction ships those are of high temperature, high humidity and shaking vigorously, during long term navigation, the medical resources available to the shipmen are limited, consequently, the shipmen may miss the best treatment time during development of chronic diseases.

SUMMARY OF INVENTION

To address the foregoing problems, the present invention proposes a large ship safety supervision system. The system is applicable for use in complex environments on large ships, so as to monitor in real time positions of the shipmen in the ships, and manage ship safety and shipmen wellbeing properly.

The present invention uses the following technical solutions:

Technical Solution One

A data transmission method applicable for use in between ships and shores, realized by hybrid self-adaptive compression technology based on model classification and data transmission link intelligent selection technology based on fuzzy neural network in turn.

The hybrid self-adaptive compression technology based on model classification is configured to compress data: first of all, building a multi-classifier for classification, an input layer and an output layer of the classification model are as follows:

The input layer={data fluctuation frequency, types of data}

The output layer={0, 1, 2, 3}

Wherein the data fluctuation frequency in the input layer means the data fluctuation frequency collected, and the types of data refer to ship data, shipmen data, hydrological data, meteorological data and oceanic data;

The classification model selects output automatically based on input, specifically:

S1: where the ship is at anchor and not working, the data fluctuation frequency reflects no fluctuation, the output tends to be 0;

S2: where the data fluctuation frequency is slow (in 100 seconds or more time fluctuation of ±3% is observed), the types of data comprise ship data and hydrological data, the output tends to be 1;

S3: where the data fluctuation frequency is gentle (no change observed in 30 seconds or more time) and the types of data comprise meteorological data and oceanic data, the output tends to be 2;

S4: in most cases other than those defined in S1, S2 or S3, the output tends to be 3;

Selecting a compression method according to the output {0, 1, 2, 3} of the model.

Specifically:

S1: where the output is 0, the compression method is: setting dynamically a size of a time window $W_t$, splitting the data using the time window, and obtaining N sets of data, reserving a first data point in first N−1 sets of data and a last data point in the Nth set of data, and realizing efficient compression;

S2: where the output is 1, the compression method is: replacing a continuous string of an equal value with numbered binary pairs comprising a string value thereof and a string length (a number of repeated characters), and during decompressing, the original data can be retrieved according to the characters and the number of continuous repeated characters;

S3: when the output is 2, the compression method used comprises the following four steps:

Step 31: reading a character in a collected data input stream, and entering the step 32:

Step 32: where a current code is in a dictionary, adding a first character of the current code as a suffix of the current character string, where the current character string is not in the dictionary, adding the current character string in the dictionary, adding the current code as a prefix of the current character string, and going to the step 33:

Step 33: where the current code is not in the dictionary, adding a first character of the prefix as a suffix, adding the character string into the dictionary, using the code of the current string as the prefix, and going to the step 34:

Step 34: putting the prefix in an output stream and going to the step 31;

S4: where the output is 3, using mean-based spinning door transformation algorithm (MSDT);

The algorithm is an improved spinning door transformation (SDT) compression method;

The conventional SDT algorithm has a high compression rate, and time required for compression and decompression is short, however, where the compressed data have large measurement deviations or noises, the data compression rate obtained by the SDT algorithm is significantly reduced. To reduce influence of the measurement noises on data compression, the present invention provides a mean-based spinning door transformation method (MSDT). While inheriting advantages of the SDT algorithm, the MSDT algorithm reduces the influence of measurement deviations on compression. The MSDT uses mean square errors as an accuracy indicator in the algorithm, the algorithm takes into consideration constraints of total decompression errors, instead of compression errors of each measured value in the constraint, and the algorithm comprises specifically the following seven steps:

Step 41: $(t_0, y_0)$ is a last storage point, Δ is a compression deviation parameter, $k^{upper}$ and $k^{lower}$ are respectively an upper threshold and a lower threshold of a slope coefficient between the last storage point and a newly received test point.

Initializing a=0, b=0, c=0, $k^{upper}$=+∞, $k^{lower}$=−∞;

Step 42: upon receiving a new test point (t, y), calculating $$\tau = t - t_0, k = \frac{y - y_0}{\tau};$$

Step 43: where $k^{lower}$<k<$k^{upper}$, going to the step 45, otherwise executing the next step;

Step 44: where the test point has not passed compression test, the test point will be stored as a new last storage point, and restarting initializing three parameters a, b, c;

$$a = \tau^2$$
$$b = -2k\tau^2$$
$$c = k^2\tau^2 - \Delta^2$$

Wherein values of τ and k are calculated based on the new last storage point and going to the step 46;

Step 45: iteratively solving a, b, c:

$$a \Leftarrow a - \tau^2$$
$$b \Leftarrow b - 2k\tau^2$$
$$c \Leftarrow c + k^2\tau^2 - \Delta^2$$

Step 46: where $b^2-4ac \leq 0$, the point has not passed compression test, and will be stored to be a new last storage point, and going to the step 41 to continue data compression;

Step 47: calculating the upper threshold $k^{upper}$ and the lower threshold $k^{upper}$;

$$k^{upper} = \frac{-b + \sqrt{b^2 - 4ac}}{2a}$$

$$k^{lower} = k^{upper} - \frac{b}{a}$$

Thereafter, going to the step 42 to continue data compression.

The data transmission link intelligent selection technology based on fuzzy neural network, realizes automatic switching between mobile communication link and satellite broad band link in between ships and shores. With the data transmission link intelligent selection technology, an optimum link is calculated and selected for transmission according to current network parameters, to adapt to different construction environments and reduce expenses while increase transmission stability.

An initial input of the data transmission link intelligent selection technology based on fuzzy neural network comprises {received signal strength RSS of network link, band width, load, latency, signal-noise ratio, communication expenses}, a final output comprises {mobile communication, satellite broad band}. The data transmission link intelligent selection technology based on fuzzy neural network comprises six layers, respectively an input layer, a fuzzy layer, a fuzzification layer, a fuzzy rule layer, a fuzzy decision layer, a de-fuzzification layer, and an output layer, specifically:

The input layer: in the input layer six input parameters are set, the six input parameters comprise network link attribute parameters, namely received signal strength RSS, network link bandwidth, loads, latency, signal-noise ratio and communication expenses;

The fuzzification layer: fuzzifying the network link attribute parameters received from the input layer according to a degree of membership function, and obtaining a fuzzy set, and the RSS, bandwidth, loads, latency, signal-noise ratio and communication expenses of the network link will be mapped to be the fuzzy set of {low, medium, high};

The fuzzy rule layer: configured to calculate grades of candidate links, and dividing the candidate links into six types utilizing a neural network {excellent, better, good, bad, poor, extremely poor};

The fuzzy decision layer: building a neural network architecture with six inputs and six outputs utilizing a neural network classifier. Given a dataset containing N initial training samples $\{X,Y\}=\{(x_i, y_m)|i, m=1, 2, \ldots, 6, X \in R^6, Y \in R^6\}$, designing a formula of neural network training as follows:

$$\sum_{j=1}^{L} B_j g_j(w_j * x_i + b_j) = y_i (i = 1, \ldots, N)$$

Wherein $x_i$ stands for the input value, L stands for a number of neurons in a hidden layer, $w_j$ stands for a weighted value of a neuron in the input layer connected with the jth neuron in the hidden layer, $B_j$ stands for a weighted value of the jth neuron in the hidden layer connected with the neuron in the output layer, $g_j( )$ stands for an activation function, $b_j$ stands for hidden layer biases, N stands for a number of samples, and $y_i$ stands for the output value;

An input layer vector and an output layer vector of the neural network classifier are respectively:

The input layer={RSS, bandwidth, loads, latency, signal-noise ratio, communication expenses}

The output layer={excellent, better, good, bad, poor, extremely poor}

The defuzzification layer: natural language variables of the grades of the candidate links in the fuzzy decision layer are defined to be {excellent, better, good, bad, poor, extremely poor}, and the defuzzification layer converts the natural language fuzzy set to be accurate values for subsequent comparison.

A calculation formula for defuzzification is as following:

$$S_l = \frac{\int (x\mu(x))^p dx}{\int (\mu(x))^p dx}$$

$$\mu(x) = e^{\frac{-(x-c)^2}{2\sigma^2}}$$

Wherein a value of p falls into [1,2], μ(x) stands for the degree of membership function, and c and σ stand respectively for a center and a standard deviation of the degree of membership function. $S_l$ represents final scores of the links;

The output layer: comparing after obtaining the scores of the links, selecting the highest value of $S_l$, and switching automatically to the link with the highest score (mobile communication link or satellite broad band link) for data transmission.

By selecting one of the candidate links with the highest link score with the data transmission link intelligent selection technology based on fuzzy neural network, accuracy of link selection results is improved while calculation expenses are reduced, in this way, the system can always calculate and select the best link for transmission automatically based on the current network parameters to be adaptive to different construction environment.

Technical solution two A large ship safety supervision system, configured to shipmen supervision and ship safety supervision, wherein shipmen supervision comprises positions of the shipmen in cabins monitoring and health data of the shipmen monitoring, and ship safety supervision comprises oceanic condition alert and warning, monitoring of running conditions of devices on ship, navigation/construction monitoring, and remote ship guidance.

Compared with the prior art, the present invention has the following advantages and beneficial effects:

In the present invention highly efficient and reliable data transmission in between ships and shores is realized by the hybrid self-adaptive compression technology based on model classification and the data transmission link intelligent selection technology based on fuzzy neural network creatively, in the meanwhile, real time safety management and supervision and ship remote work analysis and guidance can be realized, real time management and monitoring of positions and health and safety conditions of the shipmen in the multiple-compartment large ships can be realized, monitoring of health parameters such as real time position monitoring, tracking, temperature monitoring, sleep monitoring, movement monitoring and blood pressure monitoring of the shipmen in the multiple compartments can be done, and warning functions such as one-key alert, safety electronic rails and dangerous area entry warning can be provided.

BRIEF DESCRIPTION OF DRAWINGS

FIG. 4 is a diagram showing classification results after grade classification of candidate links based on neural network in an embodiment of the present invention;

EMBODIMENTS

Different from conventional commercial data, the ship data are special in that: (1) fixed signal byte length; (2) continuous changes of signals at a certain differential value; (3) signal tolerance allowing lossy compression thereof; and (4) real time generation of signals of short sequences, large volumes and carrying time dimension features. To use memory of shipborne magnetic disks efficiently, and reduce volumes of data transmitted in between ships and shores, historical data are to be compressed, and high compression rates and high compression ratios are desired.

To break through limitations on transmission of bulk sized data during offshore construction, the present invention proposes a hybrid self-adaptive compression technology based on model classification, wherein the operation work is reduced, rolled compression can be done by tracking trends and changes and the compression ratios are as high as 24:1.

Currently data transmission of large ships is done by using satellite broad bands or signals of on-land mobile base stations. Satellite broad bands have a wide coverage, but are expensive, and the bandwidth is limited; the mobile base stations cover only tens of kilometers from the on-land base stations, is not expensive, and the network bandwidth is relatively high. In the ship communication system relying on a single communication standard which is generally used nowadays, the problem of unstable communication usually occurs. How to promise communication reliability under influences of bad environments to the greatest extent and maintain the transmission rate remains a sore point and a difficult point existing in the ocean data communication at present.

In view of this, the present invention proposes a data transmission link intelligent selection technology based on fuzzy neural network to realize efficient and reliable data transmission in between ships and shores. Wherein a parallel link transmission strategy is used, an optimum network will be selected for data transmission according to the current network states, a better network will be elected by an automatic switching mechanism to be adaptive to different communication environment so as to reduce the expenses and increase transmission stability.

After compressing using the hybrid self-adaptive compression technology based on model classification, data transmission between ships and shores is further done with the data transmission link intelligent selection technology based on fuzzy neural network. By coordination of the two algorithms, highly efficient, reliable and cheap data transmission in between ships and shores is realized in special environments of ships.

Hereinafter the technical solutions provided in the present invention will be further explained in conjunction with the embodiments and drawings. In view of the following description, advantages and features of the present invention will be more apparent.

Figure 1:
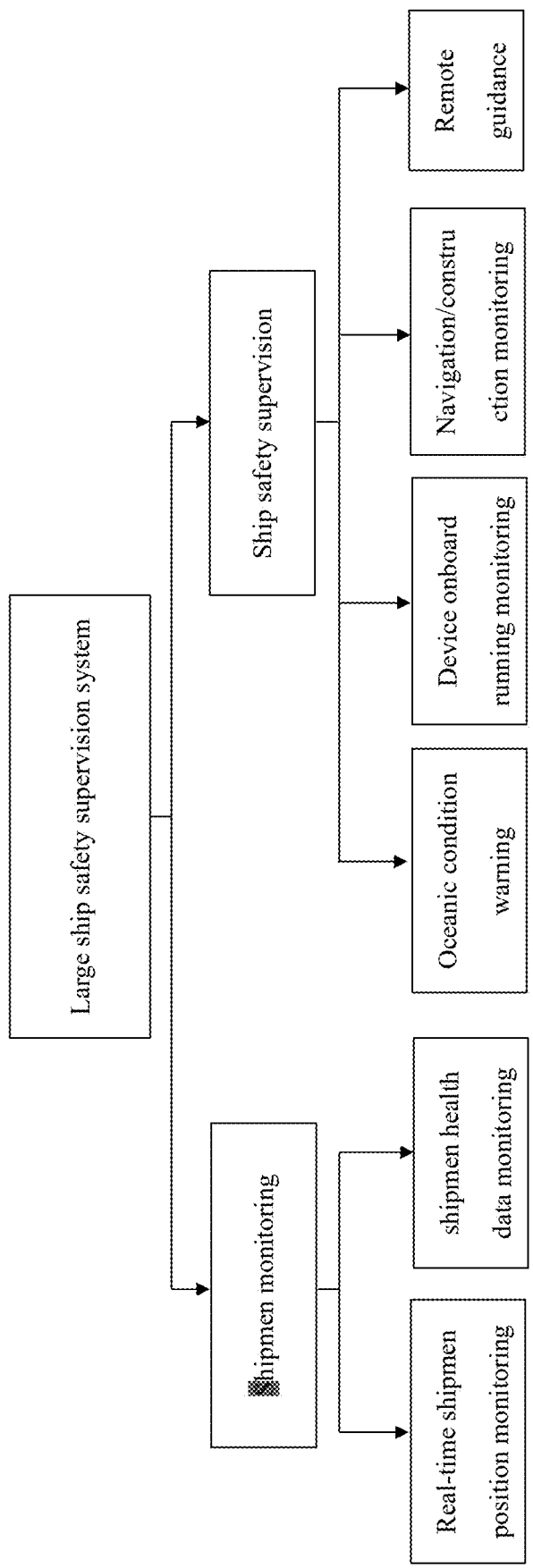
FIG. 1 is a systematic functional diagram of a large ship safety supervision system.

As shown in FIG. 1 is a large ship safety supervision system, configured to realize shipmen monitoring and ship safety supervision. Wherein shipmen monitoring comprising monitoring of real time positions of shipmen in cabins and shipmen health data, and ship safety supervision comprises oceanic condition warning, on board devices running condition monitoring, ship navigation/construction monitoring and ship remote guidance.

Figure 2:
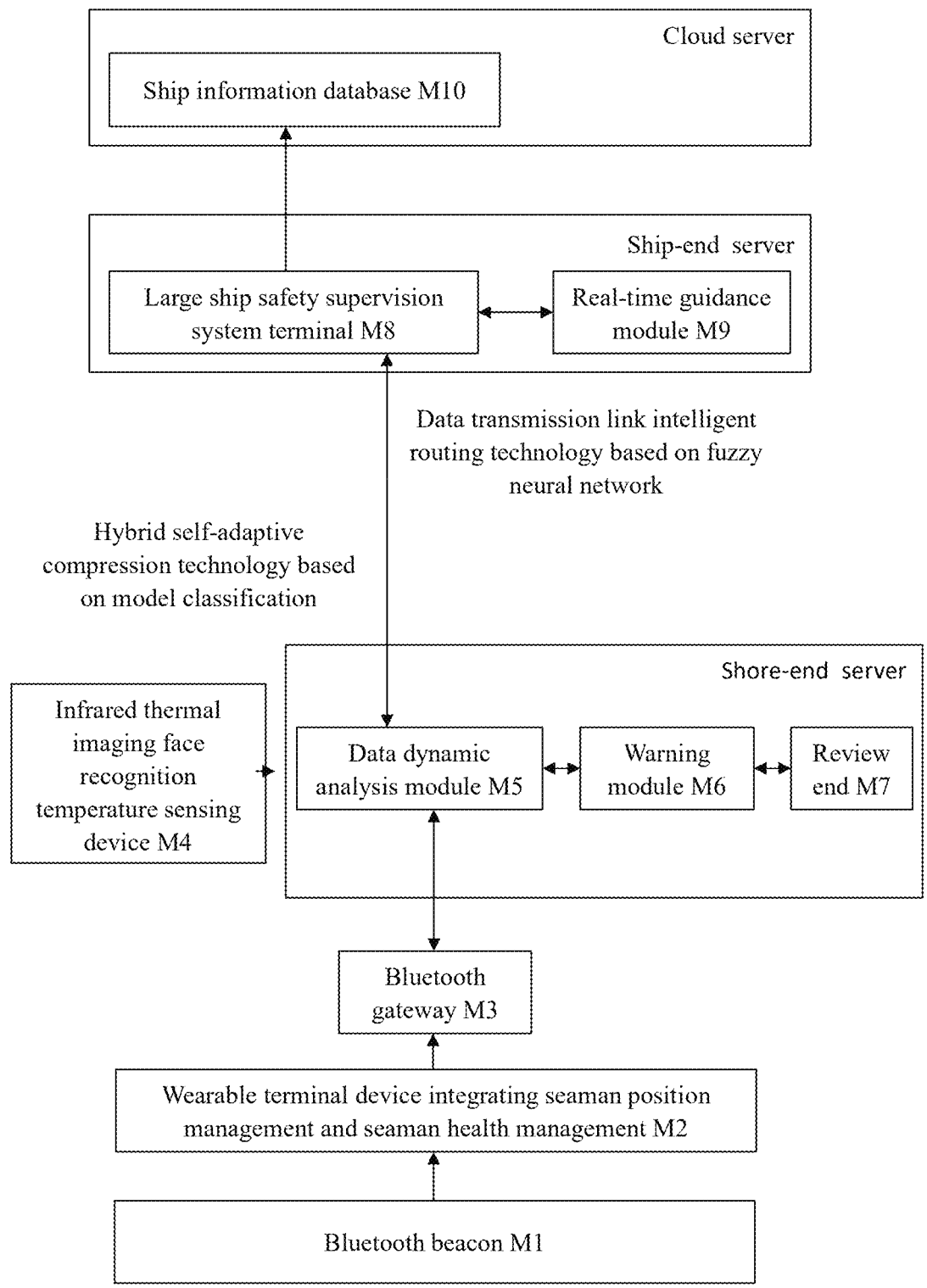
FIG. 2 is a signal flowchart diagram showing the large ship safety supervision system.
Figure 3:
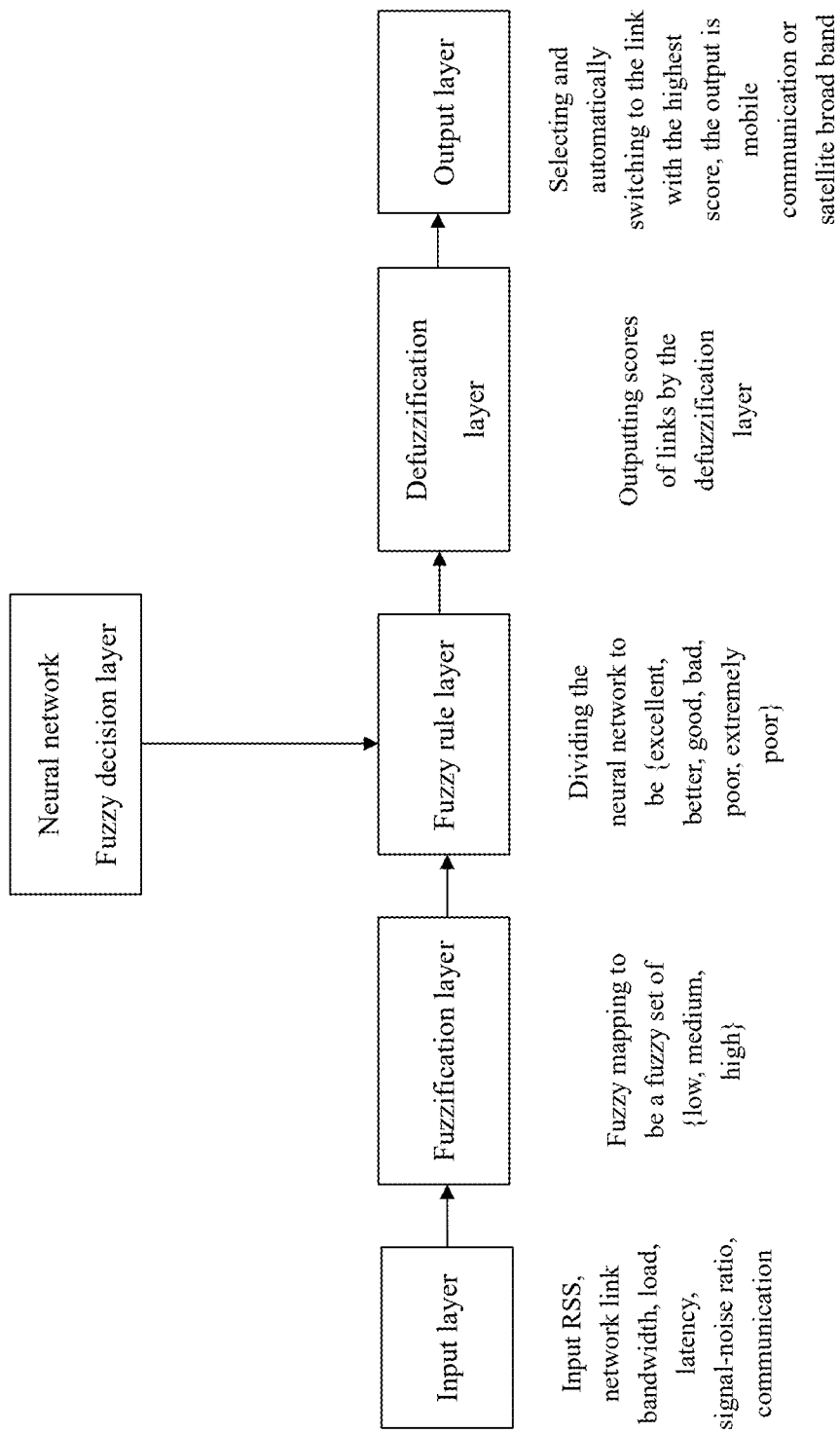
FIG. 3 is a systematic composition diagram showing a data transmission link intelligent selection algorithm based on fuzzy neural network.

As shown in FIG. 2, software and hardware modules in the present system comprise: at least one Bluetooth beacon M1, at least one wearable device M2 integrating shipmen position management and shipmen health management, at least one Bluetooth gateway M3, at least one infrared thermal imaging face recognition temperature sensing device M4, at least one data dynamic analysis module M5, at least one warning module M6, at least one personal review end M7, at least one large ship safety supervision system terminal M8, at least one real time guidance module M9 and a ship information database M10. Wherein the at least one data dynamic analysis module M5, the at least one warning module M6 and the at least one personal review end M7 are run on a ship-end server, while the at least one large ship safety supervision system terminal M8 and the at least one real time guidance module M9 are run on a shore-end server, the ship information database M10 is run on a cloud server. Signal transmission in between the foregoing modules is shown in FIG. 2.

The at least one Bluetooth beacon M1: the at least one Bluetooth beacon M1 is used along with the at least one wearable terminal device M2 integrating shipmen position management and shipmen health management, to realize real time positioning of shipmen in multiple compartments of large ships. Power consumption of Bluetooth beacons specially designed for large ships is low, the Bluetooth beacons support very long service life of over four years, and are suitable for indoor and outdoor environments in large ships. The Bluetooth beacons are deployed in areas requiring positioning (shipmen rooms, working decks, and dining rooms), are fixed in positions far from corners or obstacles, and to promise positioning accuracy, horizontal intervals between neighboring Bluetooth beacons are controlled to be 2 m.

The at least one wearable terminal device M2 integrating shipmen position management and shipmen health management: the at least one wearable terminal devices M2 integrating shipmen position management and shipmen health management are worn on each of the shipmen, configured to acquire health monitoring information and real time positions of the shipmen, and the data are transmitted to the at least one data dynamic analysis module M5 via the Bluetooth gateways M3. The wearable terminal devices M2 integrating shipmen position management and shipmen health management comprise smart bracelets, smart vests, helmets, which do not affect living and working of the shipmen when being worn, and can be used in ship shaking and strong noise environments. The devices are characterized in being of high penetration ability and long transmission distances, the signals can penetrate thick steel plates in the multiple compartments of the large ships, and monitor in real time health information such as position information, heart rate information, temperature information, blood pressure information, blood oxygen information, motion information and sleep information. The body health data and positioning data of shipmen collected with such devices are transmitted to the at least one data dynamic analysis module M5 via wireless terminals.

The Bluetooth gateways M3: separated to be large ship indoor and outdoor Bluetooth gateways. Specifically:
(1) The indoor ship Bluetooth gateways are designed to be embedded devices, high performance wifi modules, Ethernet modules and Bluetooth transceiving modules are installed therein, the Bluetooth gateways can penetrate steel plates in the large ships and satisfy data transmission requirements.
(2) The outdoor ship Bluetooth gateways are characterized in being dust-proof, water-proof, thunder-proof, firm and wearing resistance, suitable for use in outdoor conditions of special large ships, and POE power supply is supported. The Bluetooth gateways form a scanning matrix, energized by the POE or connected with a switch, and transmitted the scanned Bluetooth labeled signals to the at least one data dynamic analysis module M5 in the ship-end server.

Infrared thermal imaging face recognition temperature sensing devices M4: by non-contact full-scale human body temperature sensing to give long-distance non-contact temperature measurement to human bodies, collecting high-resolution face images with high-definition network cameras, and in conjunction with identifying identifies and names of the shipmen intelligently using dynamic face recognition algorithms, dynamic, high-speed, multi-face detection, shooting and identification is done. When the shipmen pass, the devices will generate real-time dynamic thermal images automatically, with the thermal images shipmen passed and temperature thereof can be recorded in real time, long distance, big coverage detection and multi-person simultaneous temperature screening in complex environments on board can be realized, temperature measurement is fast, accuracy is high and the coverage is full. In conjunction with real time positions of the shipmen in the multiple compartments of the large ships, shipmen movement tracks can be monitored, especially movement tracks of susceptibly fevered persons, quick positioning is realized, and management of persons passed, data and persons with irregular body temperature can be done. The monitoring data from the infrared thermal imaging face recognition temperature sensing devices are transmitted to the at least one data dynamic analysis module M5.

The at least one data dynamic analysis module M5: the data dynamic analysis module is configured to give statistical analysis to the shipmen data and the ship data. The shipmen data comprise health data and real-time position data of the shipmen, for dynamic statistical analysis of shipmen data monitored in different time periods. By dynamic real-time monitoring to the shipmen, safe positions and health of the shipmen can be promised. The data dynamic analysis module can generate weekly or monthly reports on health data of the shipmen and send to the shipmen. The ship data are automatically collected by sensors, and are transmitted to the data dynamic analysis module wirelessly. The ship data comprise data generated during ship navigation and construction, fabrication states of special ships and data on device running conditions, and oceanic information data around the ships. The data dynamic analysis module will monitor and analyze construction conditions, device running conditions, maritime warning and ocean environment safety factors centralizedly.

The at least one warning module M6: the warning module will provide real time ship and shipmen alert based on data analysis of the at least one data dynamic analysis module M5. Ship alert relates to real-time safety monitoring, safety check and safety management of remote ships, comprising providing real-time ship early warning (for example overdue ship inclination, irregular ship drafting, key device running irregularities) and real-time maritime warning (typhoon, storm and wind). Ship alert comprises active alert and passive alert. Active alert comprises the shipmen triggering SOS keys on the wearable terminal devices integrating shipmen position management and shipmen health management, sending alert actively in the terminals real-time tags, persons and positions in the compartments are shown. Passive alert comprises health data irregularity warning, such as temperature, sleep, movement, blood pressure, heart rate and blood oxygen, and entry/exit/staying of the shipmen in a non-visiting area or specific areas, erroneously entry of dangerous area alert.

The at least one personal review end M7: the at least one personal review end M7 reviews only the irregular data, for example, entering health data of one shipmen or all shipmen on a ship, when the monitoring values exceed a preset threshold an alert is sent to the at least one warning module. By manual review or sending a person abroad to inspect, the data found irregular by the data dynamic analysis module can be checked to promise robustness and authenticity of the monitoring data. The large ship safety supervision system terminals M8: the large ship safety supervision system terminals comprise a ship management system and a shipmen monitoring system, allowing the administrator onshore to view and manage the ship information and the shipmen information.

Wherein the ship management system is responsive for safety management functions such as recording, taking evidence and alerting during ship safety production activities. The ship data in construction sites are released on the Internet using multi-dimension data fusion technologies, HTML5 and WebGL (Web Graphics Library), to realize full monitoring of ocean environment conditions, ship conditions, special work conditions and positions and running states of devices onboard. In conjunction with graphs showing time-related data changes, historical record replaying in multi-speed, convenient data information sharing services are provided, remote construction monitoring, ship running monitoring and fault diagnosis is realized, working can be adjusted timely to realize remote decision.

The shipmen management system realizes shipmen position management by having the shipmen wear the wearable terminal devices, to monitor indoor positions and movement tracking of the shipmen, and is capable of one-key alert, safety electronic rail and erroneous dangerous area entry alert. By configuring the electronic rails and the SOS one-key emergency alert at the back stages, electronic rails can be provided at visit-restricted areas or special areas, upon entry/exit/stay the system will send alerts to promise personal and regional safety. In the meanwhile, the system can manage and maintain basic information and health condition information of shipmen working on the large ships, provide health parameter monitoring services such as temperature monitoring, sleep monitoring, movement monitoring and blood pressure monitoring, is capable of temperature checking and alert, and is useful in shipmen management and epidemic control during epidemic situations.

The large ship safety supervision system collects in real time bulk-sized data such as environmental information surrounding the ships, heavy construction equipment working condition information and manpower health information. In the present invention, the data are compressed with the hybrid self-adaptive compression technology based on model classification. First of all, multiple classifiers are built for classification, and an input layer and an output layer of the classification model are as follows:

The input layer={data fluctuation frequency, types of data}

The output layer={0, 1, 2, 3}

Wherein, the data fluctuation frequency in the input layer refers to fluctuation frequencies of the collected data, the types of data refer to ship data, shipmen data, hydrological data, meteorological data and oceanic data.

The classification model selects automatically the output based on the input, specifically:

S1: when the data fluctuation frequency shows no fluctuation (corresponding to conditions of ships at anchor, and construction stoppage), the output value tends to be 0.

S2: where the data fluctuation frequency is slow (fluctuation of only ±3% is observed for 100 seconds or a longer period) and the type of data is ship data and hydrological data, the output value tends to be 1.

S3: where the data fluctuation frequency is gentle (no change observed in 30 seconds or a longer period), and the type of data is meteorological data and oceanic data, the output value tends to be 2.

S4: in cases other than S1, S2, or S3, the output value tends to be 3. In most cases the output value of the classification model is 3.

Selecting the compression method automatically according to the output value of the classification model {0, 1, 2, 3}, specifically:

S1: where the output value is 0, the compression method used is: setting dynamically a size of a time window $W_t$, splitting the data with the time window, obtaining N sets of data, reserving a first data point in the first N−1 sets of data, and a last data point in the N set of data, to realize efficient compression.

S2: where the output value is 1, the compression method used is: replacing a continuous string with an equal value with a paired number binary set containing the value thereof and a string length (a number of repeated values), when decompressing, the original data can be retrieved as per the characters and the number of continuous repeated characters.

S3: where the output value is 2, the compression method used comprises the following four steps:

Step 31: reading a character in the collected data input stream, entering step 32.

Step 32: where the present code is in the dictionary, adding a first character of the present code as a suffix of the current character string, where the current character string is not in the dictionary, adding the current character string in the dictionary, and using the present code as a suffix of the character string, going to step 34.

Step 33: where the present code is not in the dictionary, using the first character in the prefix as the suffix, adding the character string in the dictionary, using the code of the present string as a prefix, and going to step 34.

Step 34: adding the prefix in the output stream and going to the step 31.

S4: where the output value is 3, using an improved spinning door transformation (SDT) compression method. Conventional SDT algorithm has a high compression rate, and compression and decompression time is short, however, where the compressed data have a large measurement error or noise, the data compression rate by the SDT algorithm will be greatly reduced. To reduce influence of the measurement noise on data compression, the present invention proposes a mean-based spinning door transformation (MSDT) algorithm, while inheriting advantages of the SDT algorithm, the influence of measurement errors on compression is reduced. The MSDT uses mean square errors as an accuracy indicator in the algorithm, the algorithm considers constraints of total decompression errors, instead of decompression errors of each of measured values in the constraints, and the algorithm comprises specifically the following seven steps:

Step 41: $(t_0, y_0)$ is a last storage point, $\Delta$ is a compression deviation parameter, $k^{upper}$ and $k^{lower}$ are respectively an upper threshold and a lower threshold of a slope coefficient between the last storage point and a newly received test point.

Initializing a=0, b=0, c=0, $k^{upper}=+\infty$, $k^{lower}=-\infty$;

Step 42: upon receipt of the new test point (t, y), calculating $$\tau = t - t_0, k = \frac{y - y_0}{\tau};$$

Step 43: where $k^{lower} < k < k^{upper}$, turning to step 45, otherwise, going to the next step;

Step 44: where the test point does not pass the compression test, the test point will be stored and used as a new last storage point, and re-initializing three parameters a, b, c $$a = \tau^2$$
$$b = -2k\tau^2$$
$$c = k^2\tau^2 - \Delta^2$$

Wherein values of $\tau$ and k are solved using the new last storage point, and turning to the step 46;

Step 45: iteratively solving a, b, c $$a \Leftarrow a - \tau^2$$
$$b \Leftarrow b - 2k\tau^2$$
$$c \Leftarrow c + k^2\tau^2 - \Delta^2$$

Step 46: where $b^2 - 4ac \leq 0$, the test point has not passed the compression test, and will be stored as a new last storage point, and turning to the step 41 to continue compression;

Step 47: calculating the upper threshold $k^{upper}$ and the lower threshold $k^{lower}$;

$$k^{upper} = \frac{-b + \sqrt{b^2 - 4ac}}{2a}$$

$$k^{lower} = k^{upper} - \frac{b}{a}$$

Thereafter, turning to the step 42 to continue data compression.

To be adaptive to special ocean communication environments, in the present invention, first of all, the hybrid self-adaptive compression technology based on model classification is used, on one aspect, upon compression, lower bandwidths can be used to satisfy requirements of large-sized data transmission, on the other aspect, operation amounts of the algorithm is small and trends and changes can be tracked. Thereafter, the compressed data are transmitted via the data transmission intelligent selection technology based on fuzzy neural network.

Figure 6:
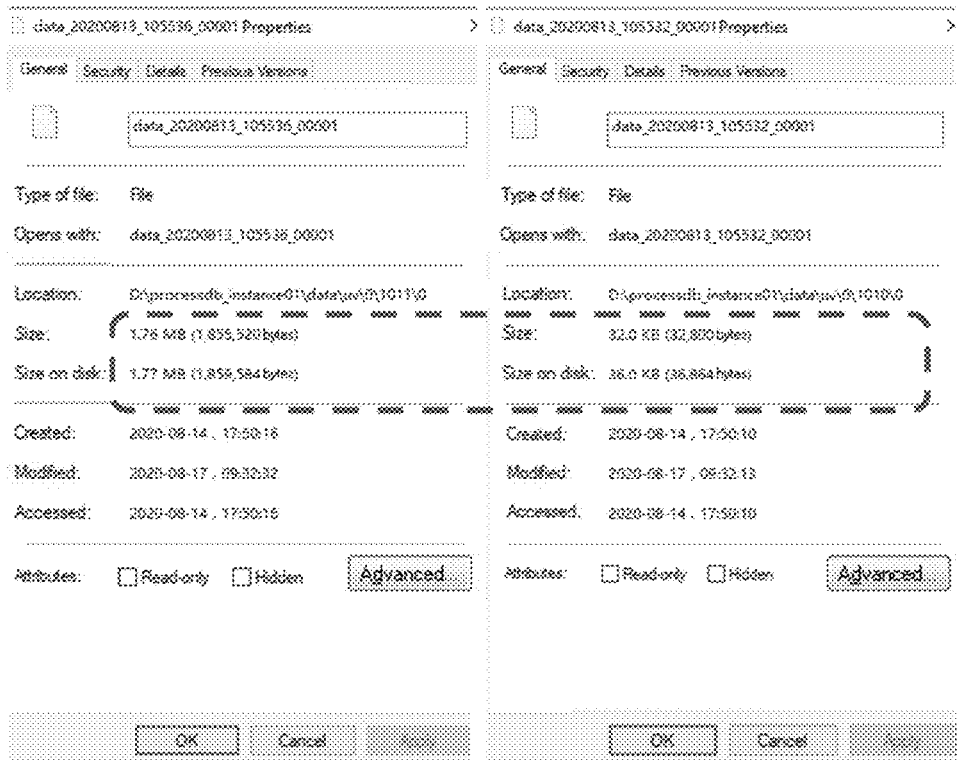
FIG. 6 is a comparison diagram showing attributes of hybrid self-adaptive compression technology based on model classification.

As shown in FIG. 6, upon multiple experiments, with the hybrid self-adaptive compression technology based on model classification, the compression ratio can be as high as 24:1 and the compression efficiency is improved for over 18%.

After being compressed by the hybrid self-adaptive compression technology based on model classification and stored, the data can be transmitted by the data transmission link intelligent selection technology based on fuzzy neural network.

During data transmission in between ships and shores, mobile communication is characterized in involving low cost and high bandwidths, however, the network coverage is not large enough; the satellite broad band has a wide coverage, but is expensive, which makes it difficult to advocate the same. In view of these situations, the present invention provides the data transmission link intelligent selection technology based on fuzzy neural network, to realize automatic switch of mobile communication link and satellite broad band link in between ships and shores. With the data transmission link intelligent selection technology based on fuzzy neural network an optimum link is calculated and selected for transmission based on the current network parameters to be adaptive to different construction environments, reduce expenses and increase transmission reliability.

Figure 5:
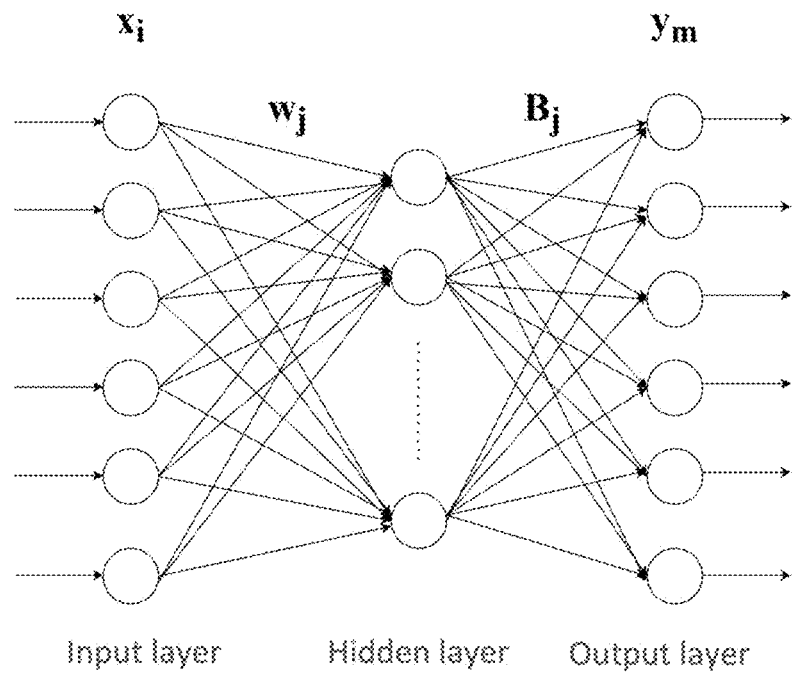
FIG. 5 is a neural network structural diagram.

The initial input of the data transmission link intelligent selection technology based on fuzzy neural network comprises {received signal strength RSS of the network link, bandwidth, loads, latency, signal-noise ratio, communication expense}, and the final output comprises {mobile communication, satellite bandwidth}. The data transmission link intelligent selection technology based on fuzzy neural network comprises six layers, respectively an input layer, a fuzzification layer, a fuzzy rule layer, a fuzzy decision layer, a defuzzification layer and an output layer, specifically:

The input layer: six input parameters are set in the input layer, the six input parameters comprise parameters defining network link attributes, respectively RSS, network link bandwidth, loads, latency, signal-noise ratio, and communication expenses;

The fuzzification layer: fuzzifying the network link attribute parameters received from the input layer according to a degree of membership function, obtaining a fuzzy set, and the RSS, bandwidth, loads, latency, signal-noise ratio and the communication expenses are mapped to be the fuzzy set of {low, medium, high};

The fuzzy rule layer: configured to calculate grades of candidate links, dividing the candidate links to be six grades with the neural network {excellent, better, good, bad, poor, extremely poor};

The fuzzy decision layer: building a neural network architecture having six inputs and six outputs with a neural network classifier (see FIG. 5). Given a dataset containing N initial training samples $\{X,Y\}=\{(x_i, y_m)| i, m=1, 2, \ldots, 6, X \in R^6, Y \in R^6\}$, designing a training formula of the neural network as follows:

$$\sum_{j=1}^{L} B_j g_j(w_j * x_i + b_j) = y_i (i = 1, \ldots, N)$$

Wherein $x_i$ stands for the input value, L comprises a number of neurons in a hidden layer, $w_j$ stands for a weighted value of neurons in the input layer connected with neurons in the jth hidden layer, $B_j$ stands for a weighted value of the neurons in the jth hidden layer connected with neurons in the output layer, $g_j(\ )$ stands for an activation function, $b_j$ stands for hidden layer biases, N stands for a number of samples and $y_i$ stands for the output value;

The input layer vector and the output layer vector of the neural network classifier are respectively:

The input layer={received signal strength RSS of the network link, bandwidth, loads, latency, signal-noise ratio, communication expense}

The output layer={excellent, better, good, bad, poor, extremely poor}

The defuzzification layer: the fuzzy decision layer defines the natural language variables of the grades of the candidate links {excellent, better, good, bad, poor, extremely poor} and the defuzzification layer converts the natural language fuzzy set to be accurate values for subsequent comparison.

A solving defuzzification formula is as follows:

$$S_l = \frac{\int (x\mu(x))^p dx}{\int (\mu(x))^p dx}$$

$$\mu(x) = e^{\frac{-(x-c)^2}{2\sigma^2}}$$

Wherein values of p fall into [1,2], $\mu(x)$ stands for the degree of membership function, c and $\sigma$ are respectively a center and a standard deviation of the degree of membership function. $S_l$ stands for the final scores of the links;

The output layer: comparing after obtaining the scores of the links, selecting a highest value in $S_l$ and switching automatically to a link with the highest score for data transmission.

With the data transmission link intelligent selection technology one of the candidate links with the highest score is selected, while computation expenses are reduced, accuracy of link selection results is improved, so that, the system can always solve and select the optimum link for transmission based on the current network parameters automatically and in real time to adapt to different construction environment.

The real-time guidance module M9: the real-time guidance module M9 provides visualized analysis and construction guidance for remote work of large ships, and represents conditions of large ships based on virtual reality technologies. With the data dynamic analysis module M5 the safety status, production status and device running status of the ships can be analyzed in real time and statistically, construction processes and parameters of the large ships can be remotely accessed and managed, and remote construction guidance and advice can be provided according to dynamic comprehensive status of the actual engineering work. A ship data and simulation data digital twin mapping model can be established, and comprehensive digital simulation and ship condition representation during navigation and production of the large ships can be done with semi-physical simulation construction 3D remote interaction platforms. Digital twin remote operation of the ships has broken limitation of time and space, ship construction can be guided while the specialist is on shores, with construction data visualization, remote video fusion and real time image fusion technologies based on twin models and reality physical spaces, "quantitative instruction" of remote guidance can be realized, the specialists can view visualized analysis and replay results of historical data, and interactive guidance by gestures, drawings and words is made possible. With visualized construction guidance of senior experts dangerous and important issues at construction sites can be efficiently addressed and important engineering projects of large ships are well-supported.

Figure 7:
FIG. 7 is a large ship virtual reality remote interaction platform.

FIG. 7 is a large ship virtual reality remote interaction platform, wherein with the semi-physical 3D remote interaction platform, comprehensive digital simulation and ship condition representation during navigation and production of the large ships are made possible.

Figure 8:
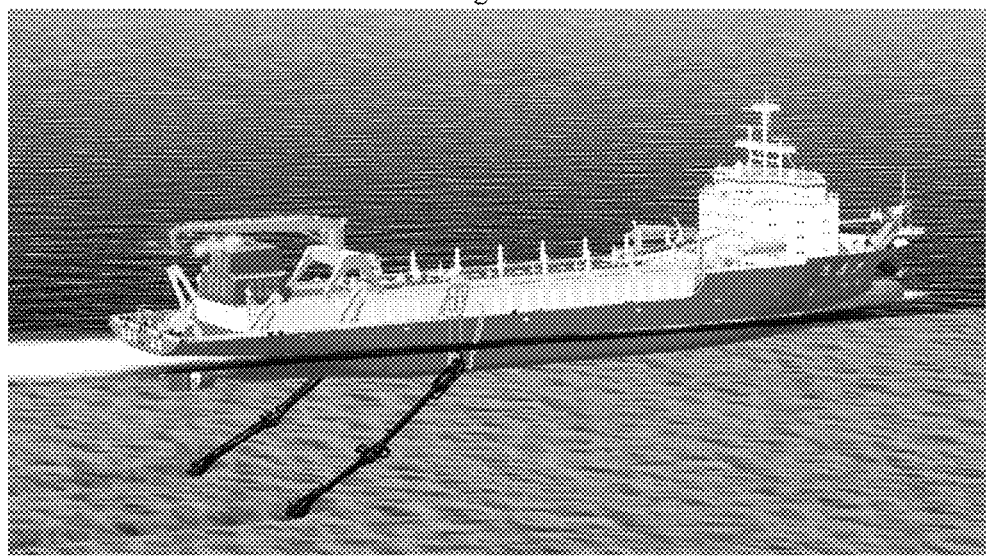
FIG. 8 shows a ship condition instance realized in 3D of a large ship.

As shown in FIG. 8 is an example of representing ship conditions in three dimensions with work data visualization, remote video fusion and real-time video fusion technologies taking use of twin models and reality physical spaces.

The ship information database M10: storing a large amount of ship information, shipmen health conditions and real-time position information into the information database, so as to realize historical data tracking of the ship and shipmen. An independent file is respectively established for each of the ships and each of the shipmen. When the large ships have access to the Internet, the ship-end server will forward the data to the shore-end server so to be synchronize the data in the ship-end server, and check the data. By configuring HTTP forwarding routes, the local server (the shore-end server) forward the data synchronously to the cloud-end server so as to synchronize information on the ships, the shores and cloud.

The foregoing is merely a description of preferred embodiments of the present invention rather than any limitation on scope of the present invention. Any modification or changes made by those of ordinary skill in the art based on the technical disclosure shall be deemed to be equivalent embodiments, and fall into the protection scope of the present invention.

The invention claimed is:

1. A large ship safety supervision system, configured to realize shipmen monitoring and ship safety supervision, wherein the shipmen monitoring comprises monitoring of real time positions of shipmen in cabins and shipmen health data, and the ship safety supervision comprises oceanic condition warning, on board devices running condition monitoring, ship navigation/construction monitoring, and ship remote guidance;

wherein software and hardware modules in the ship safety supervision system comprise: at least one Bluetooth beacon, at least one wearable device integrating shipmen position management and shipmen health management, at least one Bluetooth gateway, at least one infrared thermal imaging face recognition temperature sensing device, at least one data dynamic analysis module, at least one warning module, at least one personal review end, at least one large ship safety supervision system terminal, at least one real time guidance module and a ship information database;

wherein the at least one data dynamic analysis module, the at least one warning module and the at least one personal review end are run on a ship-end server, while the at least one large ship safety supervision system terminal and the at least one real time guidance module are run on a shore-end server, the ship information database is run on a cloud server;

wherein data are compressed with a hybrid self-adaptive compression technology based on model classification; first of all, multiple classifiers are built for classification, and an input layer and an output layer of the classification model are as follows:

the input layer={data fluctuation frequency, types of data} the output layer={0, 1, 2, 3}
wherein, the data fluctuation frequency in the input layer refers to fluctuation frequencies of collected data, the types of data refer to ship data, shipmen data, hydrological data, meteorological data and oceanic data;
the classification model selects automatically an output based on an input, specifically:
S1: when the data fluctuation frequency shows no fluctuation (corresponding to conditions of ships at anchor, and construction stoppage), the output tends to be 0;
S2: where the data fluctuation frequency is slow (fluctuation of only ±3% is observed for 100 seconds or a longer period) and the type of data is ship data and hydrological data, the output tends to be 1;
S3: where the data fluctuation frequency is gentle (no change observed in 30 seconds or a longer period), and the type of data is meteorological data and oceanic data, the output tends to be 2;
S4: in cases other than S1, S2, or S3, the output tends to be 3;
selecting a compression method automatically according to the output of the classification model {0, 1, 2, 3}, specifically:
S1: where the output is 0, the compression method used is: setting dynamically a size of a time window $W_t$, splitting the data with the time window, obtaining N sets of data, reserving a first data point in a first N−1 sets of data, and a last data point in an N set of data, to realize efficient compression;
S2: where the output is 1, the compression method used is: replacing a continuous string with an equal value with a paired number binary set containing the value thereof and a string length (a number of repeated values), when decompressing, original data are retrieved as per characters and a number of continuous repeated characters;
S3: where the output is 2, a compression method used comprises the following four steps:
step 31: reading a character in a collected data input stream, entering step 32;
step 32: where a present code is in a dictionary comprising codes and character strings, adding a first character of the present code as a suffix of a current character string, where the current character string is not in the dictionary, adding the current character string into the dictionary, and using the present code as a suffix of the current character string, going to step 34;
step 33: where the present code is not in the dictionary, using the first character in the present code as a suffix, adding the current character string into the dictionary, using the code of the current character string as a prefix, and going to step 34;
step 34: adding the prefix into an output stream and going to step 31;
S4: where the output value is 3, using an improved spinning door transformation (SDT) compression method; the SDT compression method comprising the following seven steps:
step 41: $(t_0, y_0)$ is a last storage point, $\Delta$ is a compression deviation parameter, $k^{upper}$ and $k^{lower}$ are respectively an upper threshold and a lower threshold of a slope coefficient between the last storage point and a newly received test point;
initializing a=0, b=0, c=0, $k^{upper}$=+∞, $k^{lower}$=−∞;
step 42: upon receipt of the new test point (t, y), calculating $$\tau = t - t_0, k = \frac{y - y_0}{\tau};$$

step 43: where $k^{lower} < k < k^{upper}$, turning to step 45, otherwise, going to the next step;
step 44: where the test point does not pass a compression test, the test point will be stored and used as a new last storage point, and re-initializing three parameters a, b, c:

$$a = \tau^2$$
$$b = -2k\tau^2$$
$$c = k^2\tau^2 - \Delta^2$$

wherein values of $\tau$ and k are solved using the new last storage point, and turning to step 46;
step 45: iteratively solving a, b, c;

$$a \Leftarrow a - \tau^2$$
$$b \Leftarrow b - 2k\tau^2$$
$$c \Leftarrow c + k^2\tau^2 - \Delta^2$$

step 46: where $b^2 - 4ac \leq 0$, the test point has not passed the compression test, and will be stored as a new last storage point, and turning to step 41 to continue compression;
step 47: calculating the upper threshold $k^{upper}$ and the lower threshold $k^{lower}$;

$$k^{upper} = \frac{-b + \sqrt{b^2 - 4ac}}{2a}$$

$$k^{lower} = k^{upper} - \frac{b}{a}$$

thereafter, turning to step 42 to continue data compression.

2. The large ship safety supervision system according to claim 1, wherein
a data transmission link intelligent selection technology based on a fuzzy neural network, realizes automatic switching between a mobile communication link and a satellite broad band link in between ships and shores; with the data transmission link intelligent selection technology, an optimum link is calculated and selected for transmission according to current network parameters, to adapt to different construction environments and reduce expenses while increasing transmission stability;
an initial input of the data transmission link intelligent selection technology based on the fuzzy neural network comprises {received signal strength RSS of network link, band-width, load, latency, signal-noise ratio, communication expenses}, a final output comprises {mobile communication, satellite broad band}; the data transmission link intelligent selection technology based on the fuzzy neural network comprises six layers, respectively a data link input layer, a fuzzy layer, a fuzzification layer, a fuzzy rule layer, a fuzzy decision layer, a de-fuzzification layer, and a data link output layer, specifically:

the data link input layer: in the data link input layer six input parameters are set, the six input parameters comprise network link attribute parameters, namely received signal strength RSS, network link bandwidth, loads, latency, signal-noise ratio and communication expenses;

the fuzzification layer: fuzzifying the network link attribute parameters received from the input layer according to a degree of membership function, and obtaining a fuzzy set, and the RSS, bandwidth, loads, latency, signal-noise ratio and communication expenses of the network link will be mapped to be the fuzzy set of {low, medium, high};

the fuzzy rule layer: configured to calculate grades of candidate links, and dividing the candidate links into six types utilizing a neural network {excellent, better, good, bad, poor, extremely poor};

the fuzzy decision layer: building a neural network architecture with six inputs and six outputs utilizing a neural network classifier; given a dataset containing N initial training samples $\{X,Y\}=\{(x_i, y_m)|i, m=1, 2, \ldots, 6, X \in R^6, Y \in R^6\}$, designing a formula of neural network training as follows:

$$\sum_{j=1}^{L} B_j g_j(w_j * x_i + b_j) = y_i (i = 1, \ldots, N)$$

wherein $x_i$ stands for a value of the input, L stands for a number of neurons in a hidden layer, $w_j$ stands for a weighted value of a neuron in the data link input layer connected with a jth neuron in the hidden layer, $B_j$ stands for a weighted value of the jth neuron in the hidden layer connected with a neuron in the output layer, $g_j(\ )$ stands for an activation function, $b_j$ stands for hidden layer biases, N stands for a number of samples, and $y_i$ stands for a value of the output;

an input layer vector and an output layer vector of the neural network classifier are respectively:

the input layer vector={RSS, bandwidth, loads, latency, signal-noise ratio, communication expenses} the output layer vector={excellent, better, good, bad, poor, extremely poor} the defuzzification layer is natural language variables of the grades of the candidate links in the fuzzy decision layer are defined to be {excellent, better, good, bad, poor, extremely poor}, and the defuzzification layer converts the fuzzy set to be accurate values for subsequent comparison;

a calculation formula for defuzzification is as follows:

$$S_l = \frac{\int (x\mu(x))^p dx}{\int (\mu(x))^p dx}$$

$$\mu(x) = e^{\frac{-(x-c)^2}{2\sigma^2}}$$

wherein a value of p falls into [1,2], μ(x) stands for the degree of membership function, and c and σ stand respectively for a center and a standard deviation of the degree of membership function $S_l$ represents final scores of the links;

the output layer: comparing after obtaining the scores of the candidate links, selecting the highest value of $S_l$, and switching automatically to the candidate link with a highest link score (mobile communication link or satellite broad band link) for data transmission;

wherein by selecting one of the candidate links with the highest link score with the data transmission link intelligent selection technology based on the fuzzy neural network, accuracy of link selection results is improved while calculation expenses are reduced, thereby allowing the large ship safety supervision system to always calculate and select a best link for transmission automatically based on the current network parameters to be adaptive to different construction environment.

\* \* \* \* \*